(12) United States Patent
Liao et al.

(10) Patent No.: US 12,244,753 B2
(45) Date of Patent: Mar. 4, 2025

(54) DUAL-MODE VOICE COMMUNICATIONS SYSTEM

(71) Applicant: YEALINK (XIAMEN) NETWORK TECHNOLOGY CO., LTD., Fujian (CN)

(72) Inventors: Yun Liao, Fujian (CN); Qi Yang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 202 days.

(21) Appl. No.: 17/842,782

(22) Filed: Jun. 17, 2022

(65) Prior Publication Data
US 2022/0407952 A1    Dec. 22, 2022

(30) Foreign Application Priority Data

Jun. 17, 2021 (CN) .......................... 202110675082.X

(51) Int. Cl.
*H04M 1/253* (2006.01)
*H04M 1/724* (2021.01)
*H04W 88/06* (2009.01)

(52) U.S. Cl.
CPC ......... *H04M 1/2535* (2013.01); *H04M 1/724* (2021.01); *H04W 88/06* (2013.01)

(58) Field of Classification Search
CPC .... H04M 1/2535; H04M 1/724; H04M 1/663; H04M 2250/02; H04M 2250/06; H04M 2250/08; H04M 2250/60; H04W 88/06; H04W 88/10; H04W 4/16; H04W 76/16
See application file for complete search history.

(56) References Cited

U.S. PATENT DOCUMENTS

| | | | | |
|---|---|---|---|---|
| 2007/0286171 A1* | 12/2007 | Guan | ...................... | H04L 12/66 370/356 |
| 2008/0268816 A1* | 10/2008 | Wormald | .............. | H04W 68/00 455/412.2 |
| 2009/0117889 A1* | 5/2009 | Varanda | .............. | G06F 11/0793 455/418 |

(Continued)

FOREIGN PATENT DOCUMENTS

CN           204216969 U        3/2015

*Primary Examiner* — Phung-Hoang J Nguyen

(57) ABSTRACT

A dual-mode voice communications system includes a processor, and a first communication connection module, a second communication connection module, and a wireless transceiver module that are separately connected to the processor, where the first communication connection module is configured to realize a communication connection between the dual-mode voice communications system and an Internet Protocol (IP) base station, the second communication connection module is configured to realize a communication connection between the dual-mode voice communications system and an external communications device, the wireless transceiver module is configured to realize a communication connection between the dual-mode voice communications system and a wireless terminal device, and the processor is configured to process data transmitted by the IP base station, the external communications device, and the wireless terminal device.

6 Claims, 4 Drawing Sheets

(56) References Cited

U.S. PATENT DOCUMENTS

| | | | |
|---|---|---|---|
| 2009/0163224 A1* | 6/2009 | Dean | G01S 5/14 |
| | | | 455/456.1 |
| 2014/0112207 A1* | 4/2014 | Hinrikus | H04L 12/5692 |
| | | | 370/259 |
| 2014/0321431 A1* | 10/2014 | Brunner | H04W 36/0066 |
| | | | 370/331 |
| 2016/0301653 A1* | 10/2016 | Kirchhoff | H04L 51/043 |

* cited by examiner

DUAL-MODE VOICE COMMUNICATIONS SYSTEM

CROSS-REFERENCE TO RELATED APPLICATION

The present application claims the benefit of Chinese Patent Application No. 202110675082. X filed on Jun. 17, 2021, the contents of which are hereby incorporated by reference.

TECHNICAL FIELD

The present disclosure relates to the field of communication technologies, and in particular, to a dual-mode voice communications system.

BACKGROUND

At present, there are two main wireless voice communication schemes on the market. In one scheme, a highly integrated workstation is used. In the workstation, a wireless device (for example, a headset or a handle) can be registered, and needs to be used with another communications device in an office, for example, a personal computer (PC), a mobile phone, or a telephone. In the other scheme, the wireless device (for example, the headset or the handle) is directly registered with a base station of an Internet Protocol (IP) network, for example, a wireless fidelity (Wi-Fi) handle, a Digital Enhanced Cordless Telecommunications (DECT) handle, and a DECT headset cooperate with the base station.

In the prior art, the wireless voice communication schemes can have only one mode. That is, a communications device is required, only a voice stream from the communications device can be transmitted, and registration and communication of an IP account cannot be realized; or the wireless device (the headset/handle) is registered on a deployed IP base station to transmit the voice stream, and a personal communications device cannot be connected. As a result, the wireless voice communication schemes in the prior art are characterized by a single function mode, inconvenient use, complex deployment, and other disadvantages.

SUMMARY

The present disclosure is intended to provide a dual-mode voice communications system to resolve the above technical problem, so as to effectively make it more convenient to use the communications system and reduce deployment complexity.

To resolve the above technical problem, the present disclosure provides a dual-mode voice communications system, including a processor, and a first communication connection module, a second communication connection module, and a wireless transceiver module that are separately connected to the processor, wherein the first communication connection module is configured to realize a communication connection between the dual-mode voice communications system and an IP base station, the second communication connection module is configured to realize a communication connection between the dual-mode voice communications system and an external communications device, and the wireless transceiver module is configured to realize a communication connection between the dual-mode voice communications system and a wireless terminal device; and the processor is configured to process data transmitted by the IP base station, the external communications device, and the wireless terminal device.

In a preferred solution, the processor is further configured to reject all incoming calls in a preset do-not-disturb (DND) service mode, and add information of the rejected incoming calls to a call record.

In a preferred solution, the processor is further configured to forward an incoming call to a specified account according to a preset call forwarding instruction.

In a preferred solution, the processor is specifically configured to forward all incoming calls to the specified account according to a preset Always Forward instruction, forward an incoming call received when a current account is busy to the specified account according to a preset Busy Forward instruction, and forward an incoming call not received within preset time to the specified account according to a preset No Answer Forward instruction.

In a preferred solution, the processor is further configured to transfer a current incoming call to a specified telephone according to a preset call transfer instruction.

In a preferred solution, the processor is further configured to provide a call waiting prompt for a next incoming call when a current telephone is in a call state, and answer or hold the next incoming call according to a user's selection instruction.

In a preferred solution, the first communication connection module includes at least one of a DECT communications unit and a Wi-Fi communications unit.

In a preferred solution, the second communication connection module includes at least one of a universal serial bus (USB) connection unit and a Bluetooth communications unit.

In a preferred solution, the wireless transceiver module includes at least one of a DECT communications unit, a Bluetooth communications unit, and a Wi-Fi communications unit.

In a preferred solution, the external communications device includes at least one of a PC, a mobile phone, and a desktop Session Initialization Protocol (SIP) telephone; and the wireless terminal device includes at least one of a headset and a handle.

Compared with the prior art, the present disclosure has the following beneficial effects:

The present disclosure provides a dual-mode voice communications system, including a processor, and a first communication connection module, a second communication connection module, and a wireless transceiver module that are separately connected to the processor, where the first communication connection module is configured to realize a communication connection between the dual-mode voice communications system and an IP base station, the second communication connection module is configured to realize a communication connection between the dual-mode voice communications system and an external communications device, the wireless transceiver module is configured to realize a communication connection between the dual-mode voice communications system and a wireless terminal device, and the processor is configured to process data transmitted by the IP base station, the external communications device, and the wireless terminal device. The dual-mode voice communications system provided in the present disclosure can be connected to a variety of office peripherals as a relay workstation to transmit a voice stream, and can be assigned an IP account for IP communication, thereby

DETAILED DESCRIPTION

The technical solutions in the embodiments of the present disclosure are described below clearly and completely with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
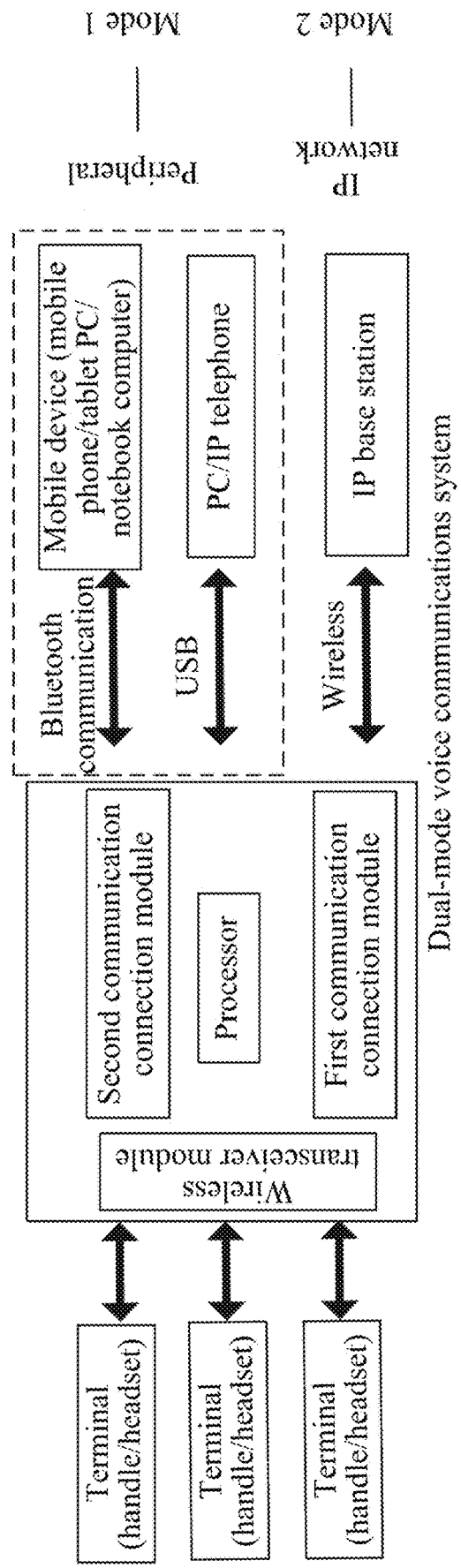
FIG. 1 is a schematic structural diagram of a dual-mode voice communications system according to an embodiment of the present disclosure.

Referring to FIG. 1, an embodiment of the present disclosure provides a dual-mode voice communications system, including a processor, and a first communication connection module, a second communication connection module, and a wireless transceiver module that are separately connected to the processor, wherein the first communication connection module is configured to realize a communication connection between the dual-mode voice communications system and an IP base station, the second communication connection module is configured to realize a communication connection between the dual-mode voice communications system and an external communications device, and the wireless transceiver module is configured to realize a communication connection between the dual-mode voice communications system and a wireless terminal device; and the processor is configured to process data transmitted by the IP base station, the external communications device, and the wireless terminal device.

In a preferred solution, the processor is further configured to reject all incoming calls in a DND service mode, and add information of the rejected incoming calls to a call record.

In a preferred solution, the processor is further configured to forward an incoming call to a specified account according to a preset call forwarding instruction.

In a preferred solution, the processor is specifically configured to forward all incoming calls to the specified account according to a preset Always Forward instruction, forward an incoming call received when a current account is busy to the specified account according to a preset Busy Forward instruction, and forward an incoming call not received within preset time to the specified account according to a preset No Answer Forward instruction.

In a preferred solution, the processor is further configured to transfer a current incoming call to a specified telephone according to a preset call transfer instruction.

In a preferred solution, the processor is further configured to provide a call waiting prompt for a next incoming call when a current telephone is in a call state, and answer or hold the next incoming call according to a user's selection instruction.

In a preferred solution, the first communication connection module includes at least one of a DECT communications unit and a Wi-Fi communications unit.

In a preferred solution, the second communication connection module includes at least one of a USB connection unit and a Bluetooth communications unit.

In a preferred solution, the wireless transceiver module includes at least one of a DECT communications unit, a Bluetooth communications unit, and a Wi-Fi communications unit.

In a preferred solution, the external communications device includes at least one of a PC, a mobile phone, and a desktop SIP telephone; and the wireless terminal device includes at least one of a headset and a handle.

In a preferred solution, the processor further includes an account processing module configured to receive account information and registration data delivered by the IP base station. A registration and account obtaining process is as follows: A user inputs a registration instruction on the relay-supported dual-mode voice communications system, and the account processing module of the dual-mode voice communications system receives the registration instruction and sends a registration request to the IP base station by the first communication connection module, such as a DECT module of the dual-mode voice communications system. Before the registration request is sent, the dual-mode voice communications system enables a registration mode to search for the IP base station. The IP base station enables the registration mode to be searched for by the dual-mode voice communications system. After finding a base station signal, the dual-mode voice communications system locks the IP base station corresponding to base station signal and then sends the registration request. The dual-mode voice communications system sends the registration request, and the registration request contains registration information, such as authentication and encryption information. The IP base station verifies the dual-mode voice communications system based on the registration information. After the verification is successful, the IP base station returns ok to complete the registration. After completing the registration, the dual-mode voice communications system initiates a locate request. The user inputs the account information on an account management page of the IP base station. The IP base station delivers account assignment information and other registration data to the dual-mode voice communications system based on the account information input by the user. The dual-mode voice communications system receives the account information and other registration data by the first communication connection module, and obtains its own account by synchronizing the account information and other registration data by the account processing module. Subsequently, the IP base station has its own account. A wireless terminal can communicate wirelessly with the dual-mode voice communications system by the wireless transceiver module, for example, transmit media data by the wireless transceiver module. When the wireless terminal makes a call by the dual-mode voice communications system, the user inputs a to-be-dialed number on the dual-mode voice communications system and presses a dial key. A call control module of the dual-mode voice communications system initiates a call request and sends media data and session control data to the IP base station by the first communication connection module. The IP base station transmits the call request of the headset to an IP network by a network port. Finally, the IP network responds to the call request and connects to a called party.

In another implementation example, the processor of the dual-mode voice communications system is configured to execute the program modules stored in a memory, including the account processing module.

In another implementation example, the dual-mode voice communications system is a hardware device, including the first communication connection module, the second communication connection module, the wireless transceiver module, and the account processing module.

Referring to FIG. 1 to FIG. 4, based on the above solution, in order to better understand the dual-mode voice communications system provided in this embodiment of the present disclosure, detailed description is provided below.

It should be noted that, in order to resolve the technical problem proposed in the background art, this embodiment of the present disclosure designs the dual-mode voice communications system to enable the user to connect to a personal communications device and an enterprise's IP network at the same time, and integrate personal communication and enterprise communication. This makes it convenient for the user to use the dual-mode voice communications system, saves costs, and reduces deployment complexity.

Figure 2:
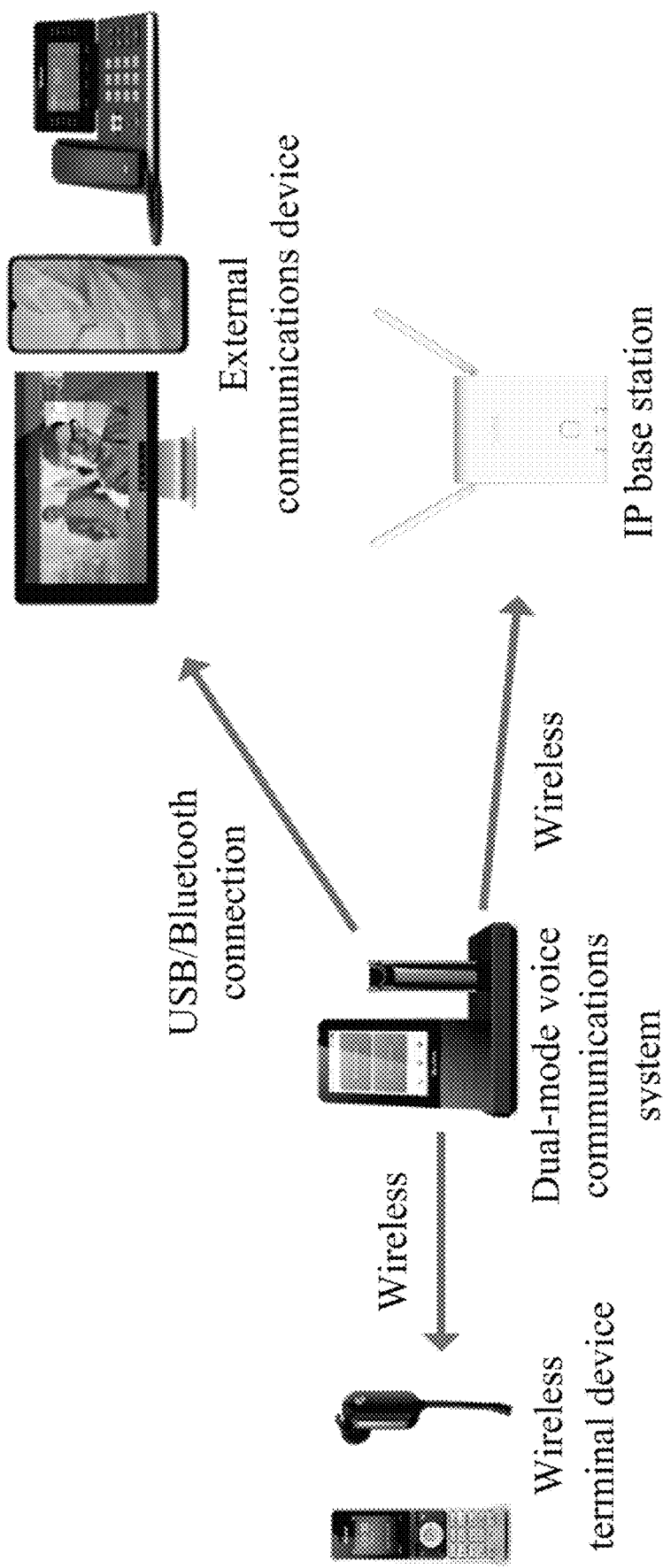
FIG. 2 is a schematic diagram of a form of a dual-mode voice communications system according to an embodiment of the present disclosure.

As a relay-supported dual-mode voice communications system, the dual-mode voice communications system provided in this embodiment of the present disclosure can be connected to the external communications device to transmit a voice stream, and can also be assigned an IP account for IP communication. Specifically, in one mode, the dual-mode voice communications system is connected to a variety of office peripherals, a voice stream of a communications device (external communications device) or software is transmitted to the dual-mode voice communications system, and the dual-mode voice communications system transmits the voice stream to the wireless terminal device by a wireless signal. In the other mode, the dual-mode voice communications system registers with an IP communications system (IP base station) by a wireless signal. A configuration and the IP account are pushed to the dual-mode voice communications system, such that the voice stream is transmitted to the dual-mode voice communications system by the IP base station, and the dual-mode voice communications system then transmits the voice stream to the wireless terminal device. A form of the system in this embodiment of the present disclosure is shown in FIG. 2.

The two modes of the dual-mode voice communications system are described in detail below.

Figure 3:
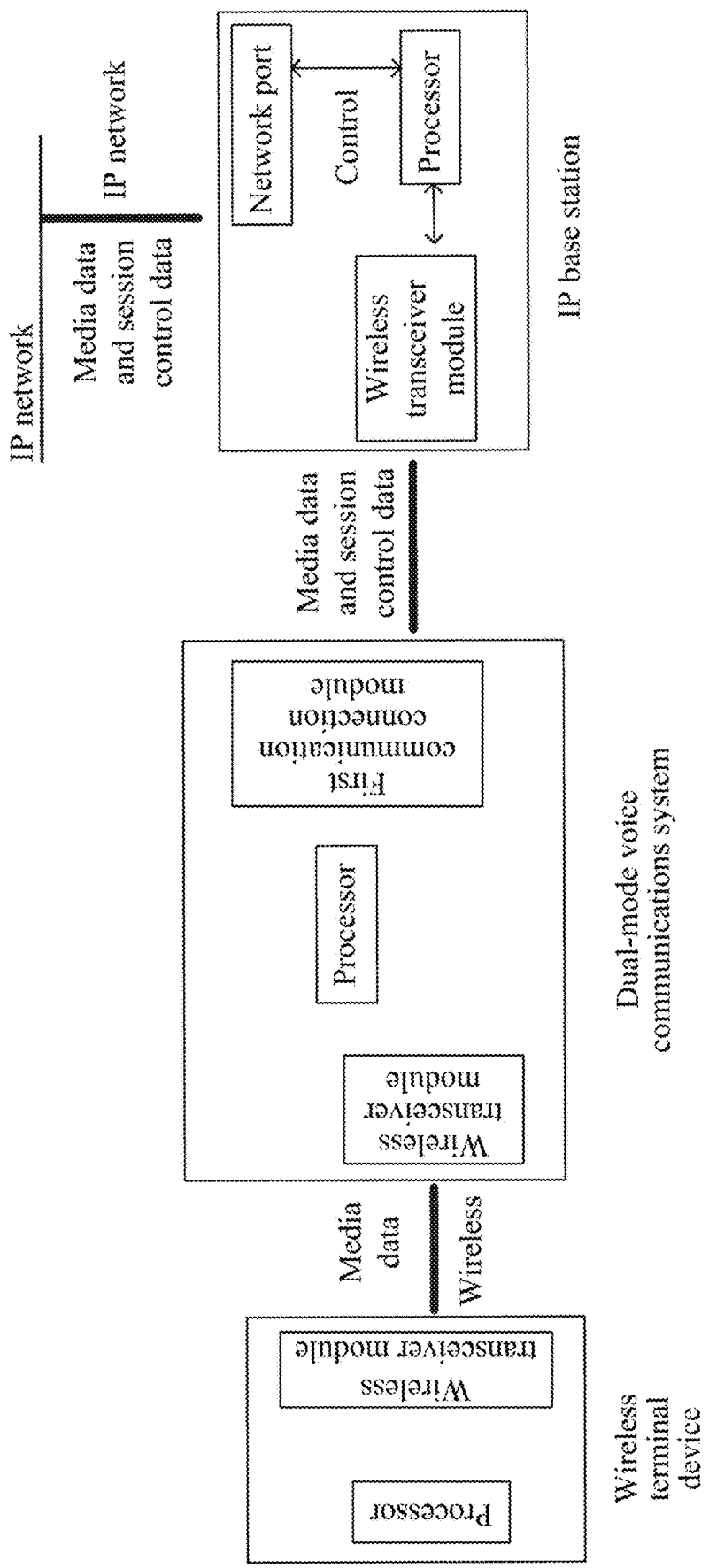
FIG. 3 is a schematic structural diagram of a dual-mode voice communications system in a mode according to an embodiment of the present disclosure.

Mode 1, as shown in FIG. 3:

The dual-mode voice communications system registers, by the first communication connection module, with an IP base station capable of transmitting and receiving a wireless signal, the IP base station can be connected to the IP network, and the wireless terminal device can register with the dual-mode voice communications system by a wireless signal. The IP base station can register the IP account, and the registered account can be assigned to the dual-mode voice communications system. In other words, the dual-mode voice communications system has the IP account, and can directly communicate with the outside by the IP network and cooperate with the registered wireless terminal device to realize mobile communication anytime and anywhere. In addition, a wireless connection between the dual-mode voice communications system and the IP base station also makes an office desktop cleaner and tidier.

In addition to the IP account assigned to perform IP voice communication, different call functions such as DND, Forward, Transfer, and CallWaiting can also be configured for this account. When the account receives an incoming call, the call is processed based on a currently configured state to realize multi-functional advantages of the IP account.

The DND, Forward, Transfer, and CallWaiting functions are described as follows:

DND: When this function is enabled, all incoming calls are rejected. For example, when the DND function is enabled for account A, for an incoming call, account A sends a DND tone to let a caller know that the call cannot be answered at present. A rejected incoming call can be queried in a call record.

Forward: This function enables a caller to forward an incoming call to another account. This function includes Always Forward, Busy Forward, and No Answer Forward. If Always Forward is enabled, all incoming calls are forwarded to a specified number immediately. If Busy Forward is enabled, an incoming call is forwarded immediately when an account is busy. When No Answer Forward is enabled, an incoming call is forwarded to a specified number if the incoming call is not answered within specific time.

Transfer: By this function, the user can transfer an incoming call to another telephone.

CallWaiting: This function enables a telephone to display information of an incoming call in any state (for example, during a call). For example, the CallWaiting function is enabled for account A, and account A establishes a call after receiving and answering a first incoming call. In this case, an incoming call prompt is still available for account A when there is a second incoming call, and it is allowed to answer the second incoming call.

Figure 4:
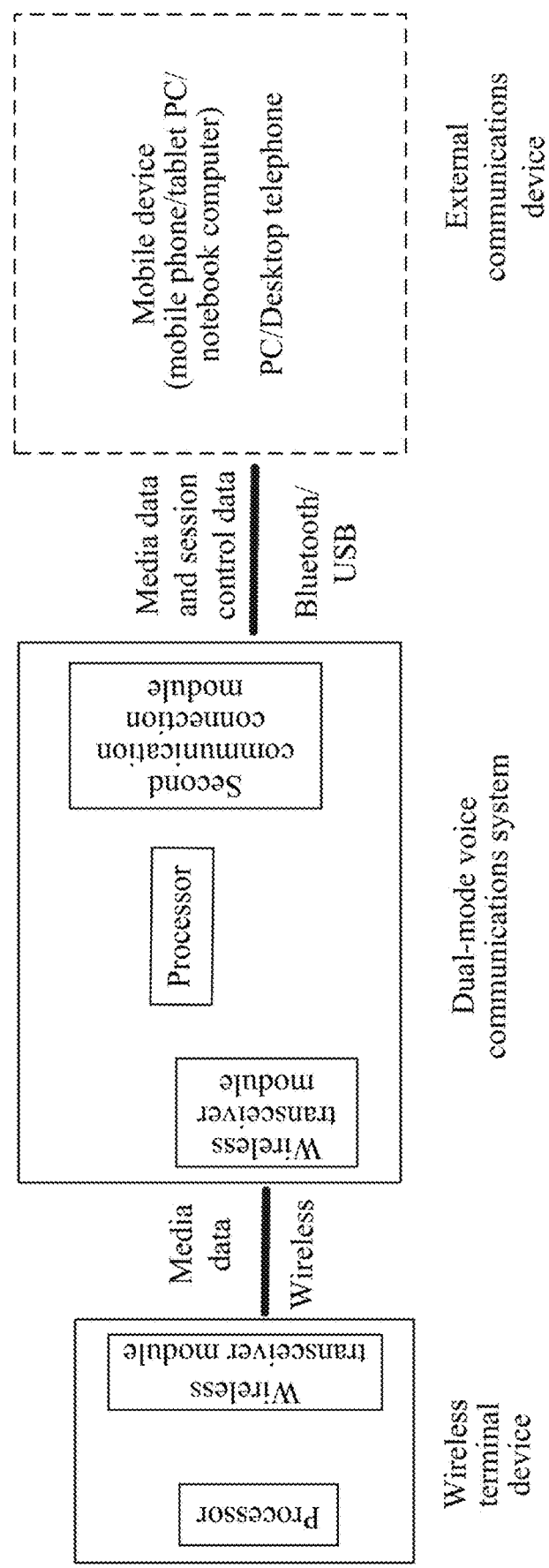
FIG. 4 is a schematic structural diagram of a dual-mode voice communications system in another mode according to an embodiment of the present disclosure.

Mode 2, as shown in FIG. 4:

The dual-mode voice communications system can be connected to an external communications device of an office, such as a mobile phone, a PC, or a desktop telephone, by a Bluetooth or USB interface (the second communication connection module). The wireless terminal device registers with the dual-mode voice communications system through a wireless connection. When the external communications device (the telephone, computer, or mobile phone) has an incoming call, the incoming call may be answered, hanged up, held, answered in a hands-free mode, or the like on a workbench, and a voice stream of the external communications device is transmitted to the wireless terminal device. In this mode, the dual-mode voice communications system has no account and only plays a control and forwarding role to process the voice stream from the external communications device and transmits a processed voice stream to the wireless terminal device.

It should be noted that the communications system in this embodiment of the present disclosure supports dual-mode system voice processing. The two modes can work at the same time, so as to integrate a personal office device and enterprise IP communication, prevent the user from having a plurality of devices and performing repeated deployment, and save costs. Incoming calls from both the external communications device and the IP network are transmitted by the dual-mode voice communications system. The dual-mode voice communications system can process a plurality of calls. The calls have no priority, and are processed based on a sequence of transmitting voice streams. If there is a call from the IP base station during a call from the external communications device, the call from the IP base station can be received, and is answered on the dual-mode voice communications system based on a selection. When the call from the IP base station is answered, the call from the external communications device is held. In addition, the two calls can be swapped by the dual-mode voice communications system. The operation is flexible and simple, which is convenient for the user to use the two modes effectively.

Referring to FIG. 1, the system and each device are connected as follows:
a. The dual-mode voice communications system and the wireless terminal device are connected in a wireless (DECT/Bluetooth/Wi-Fi) manner.
b. The dual-mode voice communications system and the IP base station are connected in the wireless (DECT/Wi-Fi) manner, and the IP account can be assigned to the workbench.
c. The dual-mode voice communications system and the external communications device may be connected in a USB or Bluetooth manner, to transmit the voice stream of the device or software to the wireless terminal device.

Compared with the prior art, the present disclosure has the following beneficial effects:

The present disclosure provides a dual-mode voice communications system. The dual-mode voice communications system can be connected to a variety of office peripherals to transmit a voice stream of a communications device or software to a wireless portable terminal device (for example, a headset or a handle) to realize mobile voice communication; and can also be connected to an IP network, such that the IP network assigns an IP account and pushes related configurations, so as to control an IP call and session, and transmit the IP call and session to a terminal device (for example, the headset or the handle) by a wireless signal, to realize mobile voice communication. Specifically, a corresponding IP account is assigned to a user in an IP network system to realize mobile IP voice communication, and call operations such as Forward, DND, Transfer, and Call Waiting can be configured based on an IP technology. The dual-mode voice communications system can also be connected to a personal office device such as a computer, a mobile phone, or desktop telephone to transmit voice streams of the communications device and the software.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A dual-mode voice communications system, comprising a processor, and a first communication connection module, a second communication connection module, and a wireless transceiver module that are separately connected to the processor,
wherein the first communication connection module is configured to realize a communication connection between the dual-mode voice communications system and an Internet Protocol (IP) base station, the second communication connection module is configured to realize a communication connection between the dual-mode voice communications system and an external communications device, and the wireless transceiver module is configured to realize a communication connection between the dual-mode voice communications system and a wireless terminal device; and
the processor is configured to process data transmitted by the IP base station, the external communications device, and the wireless terminal device;
wherein the processor further comprises an account processing module configured to receive account information and registration data delivered by the IP base station; wherein the processor is further configured to transmit a voice stream of the external communications device to the wireless terminal device, and transmit a voice stream transmitted by the IP base station to the wireless terminal device; and
the first communication connection module and the second communication connection module work at a same time;
wherein the first communication connection module comprises at least one of a Digital Enhanced Cordless Telecommunications (DECT) communications unit and a wireless fidelity (Wi-Fi) communications unit; and the second communication connection module comprises at least one of a universal serial bus (USB) connection unit and a Bluetooth communications unit; and
wherein the processor is further configured to forward an incoming call to a specified account according to a preset call forwarding instruction; wherein the processor is specifically configured to forward all incoming calls to the specified account according to a preset Always Forward instruction, forward an incoming call received when a current account is busy to the specified account according to a preset Busy Forward instruction, and forward an incoming call not received within preset time to the specified account according to a preset No Answer Forward instruction.

2. The dual-mode voice communications system according to claim 1, wherein the wireless transceiver module comprises at least one of a DECT communications unit, a Bluetooth communications unit, and a Wi-Fi communications unit.

3. The dual-mode voice communications system according to claim 1, wherein the processor is further configured to reject all incoming calls in a preset do-not-disturb (DND) service mode, and add information of the rejected incoming calls to a call record.

4. The dual-mode voice communications system according to claim 1, wherein the processor is further configured to transfer a current incoming call to a specified telephone according to a preset call transfer instruction.

5. The dual-mode voice communications system according to claim 1, wherein the processor is further configured to provide a call waiting prompt for a next incoming call when a current telephone is in a call state, and answer or hold the next incoming call according to a user's selection instruction.

6. The dual-mode voice communications system according to claim 1, wherein the external communications device comprises at least one of a personal computer (PC), a mobile phone, and a desktop Session initialization Protocol (SIP) telephone; and the wireless terminal device comprises at least one of a headset and a handle.

* * * * *